United States Patent [19]

Frech et al.

[11] Patent Number: 4,655,144
[45] Date of Patent: Apr. 7, 1987

[54] CABIN FOR ACCOMMODATING PASSENGERS

[75] Inventors: Anton Frech, Weggis; Georg Riser, Böckten, both of Switzerland

[73] Assignee: CWA Constructions SA, Olten, Switzerland

[21] Appl. No.: 694,395

[22] PCT Filed: Apr. 24, 1984

[86] PCT No.: PCT/CH84/00060
§ 371 Date: Dec. 13, 1984
§ 102(e) Date: Dec. 13, 1984

[87] PCT Pub. No.: WO84/04283
PCT Pub. Date: Nov. 8, 1984

[30] Foreign Application Priority Data

Apr. 20, 1983 [CH] Switzerland ............... 2116/83

[51] Int. Cl.⁴ .............. B60N 5/00; B61D 17/00; E05F 13/00
[52] U.S. Cl. ......................... 105/341; 49/262; 49/340; 105/149.1
[58] Field of Search ............. 105/329 R, 329 S, 339, 105/341, 395, 343, 397; 104/28; 49/109, 110, 262, 280, 340, 345

[56] References Cited

U.S. PATENT DOCUMENTS

| | | | |
|---|---|---|---|
| 4,087,939 | 5/1978 | Elguindy et al. | 49/280 X |
| 4,327,648 | 5/1982 | Frech | 105/150 |
| 4,433,505 | 2/1984 | Viner | 49/110 |
| 4,454,685 | 6/1984 | van der Sloot et al. | 49/340 X |

FOREIGN PATENT DOCUMENTS

| | | | |
|---|---|---|---|
| 129397 | 7/1932 | Austria | 105/341 |
| 0062726 | 10/1982 | European Pat. Off. | |
| 2485077 | 12/1981 | France. | |
| 55142 | 5/1968 | Poland | 105/341 |
| 195777 | 4/1965 | Sweden | 49/110 |
| 569603 | 11/1975 | Switzerland. | |
| 603398 | 8/1978 | Switzerland. | |
| 611679 | 6/1979 | Switzerland. | |
| 858418 | 1/1961 | United Kingdom. | |

Primary Examiner—Randolph A. Reese
Attorney, Agent, or Firm—Werner W. Kleeman

[57] ABSTRACT

A passenger cabin for an aerial cable railway or the like is constructed from outwardly convex panels connected at their adjoining edges by hollow profile sections. One sidewall of the cabin is equipped with a door. Sensing members of the cabin engage control members of the cable railway stations and transmit a control motion to a door actuation mechanism within the floor construction of the cabin. A crank operates a rocker arm which drives two connecting rods. Racks arranged on the connecting rods drive sector gears mounted on the cabin and cause pivot arms connected with each leaf of the door to pivot. The pivot arms cause the doors to translate along and pivot conjointly with guide rails hinged at their common center. The door leaves can therefore be flush with the sidewall of the cabin in the closed position and require a minimum of space in opening.

22 Claims, 12 Drawing Figures

CABIN FOR ACCOMMODATING PASSENGERS

BACKGROUND OF THE INVENTION

The present invention broadly relates to cabins for accommodating passengers and, more specifically, pertains to a new and improved construction of a passenger car or gondola for transport apparatuses or media.

Generally speaking, the cabin of the present invention is for accommodating passengers of a transport medium, such as a gondola lift or aerial cable railway or the like, and comprises a doorway, at least one door member for closing the doorway and a guide means associated with each door member for translatably guiding the door member. The cabin of the present invention also comprises a sensing member for sensing the control members of the stations, door actuating means operatively connected with the sensing member for opening the door member when entering a station and for closing the door member when departing a station and means defining a vertical pivot axis. The door actuating means has at least one pivot arm pivotably mounted to the cabin to pivot about the vertical pivot axis. The pivot arm comprises a vertical pin and is hinged to the door member by the vertical pin. The cabin of the present invention also comprises a floor structure, a roof structure, a structural frame connecting the floor structure with the roof structure, two mutually opposite sidewalls and two mutually opposite end walls arranged between the floor structure and the roof structure and a doorway formed in at least one of the sidewalls. Each of the sidewalls meets each of the end walls at edge regions thereof and profiled section members extend along these edge regions and serve to join the sidewalls with the end walls. The end walls are convexly curved.

Passenger cars or gondolas for transport media, namely aerial cable railways, are known from the Swiss Pat. Nos. 569,603, No. 603,398 and No. 626,842, which comprise a cabin with a floor, two sidewalls, two end walls and a roof. Swiss Pat. No. 569,603 corresponds to U.S. Pat. No. 3,871,324 and Swiss Pat. No. 626,842 corresponds to U.S. Pat. No. 4,327,648. One sidewall of such gondolas is provided with a door opening which is closeable with a one or two leaved door. The door leaves are either pivotable about a pivot axis which is stationary with respect to the gondola cabin or else is translatable along a horizontal guide rigidly mounted on the gondola cabin. Control members are arranged at the stations of such transport media. The gondolas are equipped with sensing members with which they can sense these control members. These sensing members are in operative connection with the door leaves by means of an actuating device so that the door leaves are automatically opened when arriving in a station and are automatically closed again when departing.

If the door leaves are pivotable about a pivot axis which is stationary with respect to the gondola and, when opening in a station, are opened outwardly, they swing relatively far out into the station. Spatial requirements of the stations are thus increased and measures must be taken in order that the automatically opening door leaves do not injure any of the passengers waiting in the station.

In those known cabins in which the door leaves are translatable in relation to the gondola cabin, the sidewalls delimiting the door opening are equipped with guides for the door leaves. The door leaves and their guides must be at least partially arranged on the exterior of the sidewall. It is then difficult to protect the guides against climatic influences and, especially in aerial cable railways for winter operation, against snow and ice. When the door leaves are situated on the exterior of the sidewalls, their edges form shoulders in relation to the sidewalls which increase wind resistance, which has a disadvantageous effect, especially in strong winds. Furthermore, sliding door leaves situated on the exterior of the sidewalls increase the width of the gondola cabins. A greater width of the gondola, however, in turn increases spatial requirements in the stations and for their storage, i.e. accommodation of the gondolas during off seasons.

The apparatus for automatically opening and closing the door leaves is accommodated mainly in the floor portion of the gondola cabin in known gondolas and requires relatively much space in floor plan. For instance, in the gondola known from the Swiss Pat. No. 603,398, which comprises translatable door leaves, this apparatus extends over the entire width of the gondola. This makes it, difficult or impossible to provide a desirable vertical central support anchored in the floor in the middle of the gondola and extending therefrom to the roof.

In the gondolas known from the previously mentioned patents, the gondola cabins comprise a structural framework and an external sheathing, wherein the sidewalls are formed by essentially vertical planes. The gondolas therefore present a high wind resistance to side winds and are therefore strongly deflected by side winds and excited to lateral oscillations or swinging motion. If a gondola having vertical, planar sidewalls is deflected transversely to the direction of travel by wind action or by motions of the passengers, the bottoms of the sidewalls are moved laterally beyond the normal position of the sidewalls. In order that this not cause damage or become dangerous, the entry buffers of the stations and other related dimensions must be made relatively generous.

The gondola cabins of the gondolas known from the previously cited patents comprise a structural framework and an external sheathing. In the gondola according to the Swiss Pat. No. 626,842, both sidewalls comprise profiled section members extending along their edges which are welded together at their abutting locations. In the doorless sidewall, these profiled section members form a closed framework. In the sidewall provided with a door opening, the profiled section member extending along the lower wall edge is interrupted in the region of the door opening. The roof comprises a structural frame which is formed from profiled section members extending along its edges and welded together at their abutting locations. The profiled section members of the roof frame extending along the sidewalls are screwed to the profiled section members forming the upper edges of the sidewalls. The bearing structure of the floor is also partially formed from profiled section members welded or screwed together. Both end walls comprise a horizontal profiled section member at their lower edge on whose ends profiled section members are welded which extend along the end wall side edges about up to the half height of the cabin. The profiled section members of the end walls are screwed to the floor, respectively to the profiled section members of the sidewalls. The fabrication of this gondola cabin requires a relatively great variety of profiled section members and other components as well as a relatively great amount of welding work, while the screwing of the profiled bars is also time-consuming. The fabrication and assembly of this gondola is therefore relatively material and labor-intensive.

SUMMARY OF THE INVENTION

Therefore, with the foregoing in mind, it is a primary object of the present invention to provide a new and improved construction of a cabin for the accommodation of passengers which is especially suitable for forming a car or gondola of a transport medium, such as an aerial cable railway, and which does not exhibit the aforementioned drawbacks and shortcomings of the prior art consructions.

Another and more specific object of the present invention is to provide a new and improved construction of a cabin for passengers which avoids those disadvantages which result from equipping previously known gondolas with doors whose door leaves are either pivotable about a pivot axis which is stationary with respect to the gondola cabin or which are translatable along a guide fixed upon the gondola cabin.

Yet a further significant object of the present invention aims at providing a new and improved construction of a passenger cabin of the character described which is relatively simple in construction and design, extremely economical to manufacture, highly reliable in operation, not readily subject to breakdown or malfunction and requires a minimum of maintenance and servicing.

Now in order to implement these and still further objects of the invention, which will become more readily apparent as the description proceeds, the passenger cabin of the present invention is manifested by the features that: the guide means comprise upper guide means and lower guide means; the upper guide means define an upper vertical pivot axis and are pivotably mounted to the cabin to pivot about such upper vertical pivot axis; the lower guide means define a lower vertical pivot axis coaxial with the upper vertical pivot axis and are pivotably mounted to the cabin to pivot about such lower vertical pivot axis; means are provided defining a further vertical pivot axis; at least one pivot arm is pivotable about one further vertical pivot axis; means are provided for pivoting this pivot arm about this further vertical pivot axis; and a hinge connection is provided for connecting the pivot arm to the door member.

In a further embodiment, the passenger cabin of the present invention comprises: a crank operatively connected with the sensing member; a sector gear; the pivot arm being connected to this sector gear and fixed against rotation in relation thereto; a gear rack; mounting means for mounting the gear rack translatably and pivotably in relation to the cabin and in engagement with the sector gear; an intermediate member of limitably variable length; a rocker arm mounted on the crank; and the gear rack being connected with the rocker arm by the intermediate member.

In a further embodiment, the sidewalls of the passenger cabin of the present invention are convexly curved. In yet a further embodiment, the passenger cabin of the present invention is manifested by the features that the floor structure comprises a floor frame constructed of profiled section members all of which have ends and incorporate a hollow void, connection members are provided for interconnecting the profiled section members at the ends thereof and the connection members each comprise three connector plugs for engaging in the hollow void of associated ones of the profiled section members.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
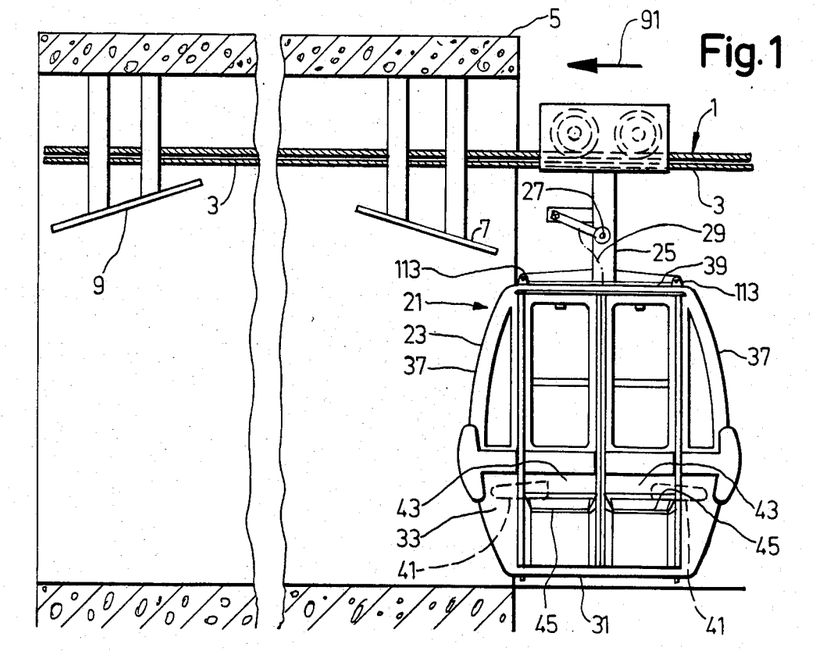
FIG. 1 shows a gondola lift with a schematically represented lift station and a gondola cabin before entry into the lift station viewed towards that sidewall of the gondola which has a door.

Describing now the drawings, it is to be understood that to simplify the showing thereof only enough of the structure of the passenger cabin has been illustrated therein as is needed to enable one skilled in the art to readily understand the underlying principles and concept of this invention. Turning now specifically to FIG. 1 of the drawings, the apparatus illustrated therein by way of example and not limitation will be seen to comprise a transport medium, namely a gondola lift or an aerial cable railway, which includes a support or transport cable 1, a tension or drive cable 3 and two or more stations, one of which is generally designated with the reference numeral 5, as illustrated in FIG. 1. The station 5 is provided with two control members 7 and 9.

The gondola lift of the exemplary embodiment illustrated further comprises cars or gondolas, one of which is generally designated with the reference numeral 21.

The gondola 21 possesses a cabin or housing 23 serving for the accommodation of passengers and a suspension or carrying structure 25 equipped with support or transport wheels running on the support cable 1 and which can operatively engage the drive cable 3. The suspension structure or column 25 is further provided with a sensing member 27, namely a sensing lever for sensing the control members 7 of the lift stations 5. The sensing member 27 is connected with a door actuating apparatus 201 (cf. FIGS. 6 and 7) arranged within the gondola floor structure 31 by a flexible pull cable 29 serving for transmitting push and pull motions or forces, for instance a Bowden cable or the like.

The cabin 23 of the gondola 21 also illustrated separately in the FIGS. 2 through 5 possesses a floor structure 31, two mutually opposed sidewalls 33, 35, two end walls 37 and a roof structure 39. Both sidewalls 33, 35 and both end walls 37 are convexly curved, so that the cabin 23 has a greater peripheral dimension at its half height and narrows or tapers upwardly and downwardly from this location. A seat 41 is arranged in the interior of the cabin 23 at each end wall 37 which, for instance, can be constructed as a bench for three persons so that in total six passengers can be seated in the gondola 21. The side wall 33 is provided with a door opening which is closeable by a door construction 43' comprising two door leaves or members 43. Each door leaf or member 43 possesses a window in its upper portion and may be provided with a ski rack 45 at its lower portion on its exterior side, whereby each of the ski racks 45 may comprise pockets for inserting, for instance, three pairs of skis.

Figure 2:
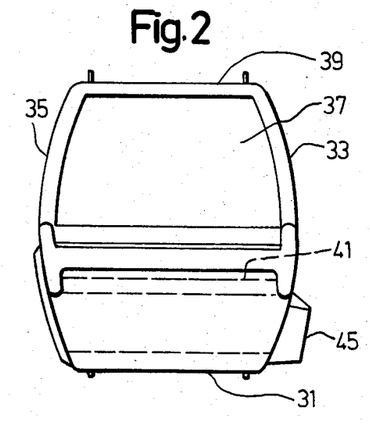
FIG. 2 shows a view of an end wall of the gondola cabin.
Figure 3:
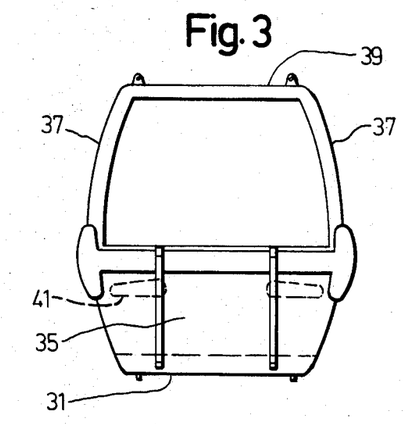
FIG. 3 shows a view of the doorless sidewall of the gondola cabin.
Figure 4:
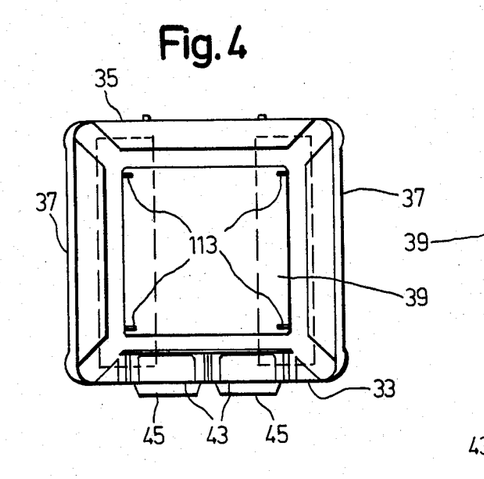
FIG. 4 shows a plan view of the gondola cabin with the door leaves in the closed position.

Both door leaves or members 43 are curved to the same convex shape as the sidewalls 33. Each of the both door leaves 43 is movably mounted on stationary parts of the gondola 23 by suitable conventional mounting means not described in more detail such that each door leaf 43 is both pivotable about a vertical pivot axis and horizontally translatable. The aforementioned mounting means are designed such that the door leaves 43, when in their closed position illustrated in the FIGS. 1, 2 and 4, are, apart from the ski racks 45, flush with the laterally adjacent sections of the sidewalls 33 at their manually remote upright edges, i.e. the exterior surfaces of both door leaves 43 are flush with one another and with the exterior surfaces of the adjoining sections of the sidewall 33 when closed.

Figure 5:
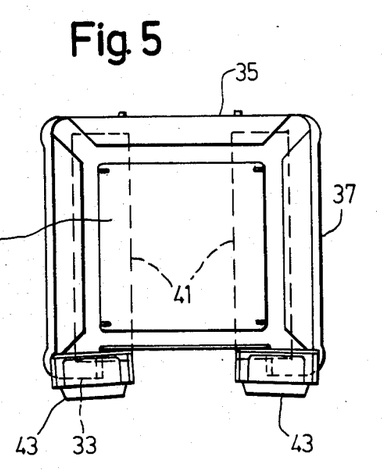
FIG. 5 shows a plan view of the gondola cabin with the door leaves in the open position.

When opening the door leaves 43, the latter are pivoted outwardly and simultaneously slid away from one another in the horizontal direction so that they arrive in the open position illustrated in FIG. 5. In this open position, the door leaves 43 expose a door opening or doorway 200 whose width is approximately equal to the dimension of the intervening space between the two seats 41.

In the following, the mounting means for movably mounting the door leaves or members 43 and the door actuation apparatus 201 for automatically opening and closing the door construction 43' will be explained in relation to the FIGS. 6 through 8.

The floor structure 31 comprises a schematically indicated structural frame or framework fabricated from profiled section members and other components and an inner floor 31a as well as an exterior bottom surface 31b. The door actuating apparatus 201 is arranged mainly in the void existing between the inner floor 31a and exterior bottom surface 31b and the mounting means serving to movably mount the door leaves 43 are also partially accommodated therein.

One straight guide 51 for door leaf 43 extends substantially horizontally in the proximity of the upper and lower edges of both door leaves 43 on their interior sides. Each of these four straight guides 51 comprise a horizontal bar or rod and is pivotably journaled by a hinge-like pivot bearing 53 about a vertical pivot axis 53' which lies in a vertical center plane approximately halfway between both end walls 37. Each straight guide 51 guides a slider or shoe 55 which comprises a casing and bearing balls or rollers arranged therein. The lower door leaf or edge regions, only one of which is indicated in FIGS. 6 and 7, extend, as can be seen from FIG. 8, to the proximity of the lower slider or shoe 55 and are rigidly fastened to the latter in the proximity of the mutually confronting edges of both door leaves 43 abutting one another in the closed position. The upper door leaf edges or edge regions are analogously constructed and guided.

Bearing means 59 are arranged on the rigid components of the cabin structure associated with the floor structure 31 in the interior of the gondola in proximity of both lateral jamb regions 57 of the door opening or doorway 200 which each define a vertical pivot axis 59' about which an approximately crescent-shaped pivot arm 61 is pivotable. The other ends of these pivot arms 61 are connected on to the door leaves 43 on the interior sides by hinges with vertical hinge pins 63. These hinge pins 63 are situated on the mutually remote halves of both door leaves 43.

Each pivot arm 61 is fixed against rotation to a member comprising a sector gear, i.e. a segment of a gear, or a cylindrical gear 65 having gear teeth 65' which extend at least over a sector of a circle coaxial with the pivot axis 59'. A mounting means 67 is connected with the floor structure 31 about a vertical pivot axis 69 in the proximity of each sector gear or gear 65. Each mounting means 67 comprises an upwardly open channel on its side confronting the gear teeth 65'. A gear rack 71 bearing or sliding in this channel is guided laterally at its lower side by the mounting means 67 so that it is longitudinally translatable along the channel and is movable, e.g. translatable and pivotable about the pivot axis 59' of the gear teeth 65' within certain limits and therefore always remains in engagement with the gear teeth 65'.

A crank 72 is rotatably journaled in the floor structure 31 by a vertically arranged crank pin 75 in a not particularly shown bearing which is stationary with respect to the gondola floor structure 31. A pivot arm pair or rocker arm 73 is fastened to the crank pin 75. A push or connecting rod 77 is hinged by a pin 79 to the end of each preferably forked pivot arm 73' and 73" of the pivot arm pair or rocker arm 73, whereby the construction is preferably so designed that the push or connecting rod 77 is conducted through a transverse bore of the pin 79 and is provided with a nut or anchor pin at its outer end, while a stop means 77a is provided on the other side of the pin 79 which, for instance, fixes a spring means 81, for instance a spring package formed from Belleville washers. This construction forms an intermediate member 77' having a length which is limitably variable against the force of the spring means or package 81. The end of each push or connecting rod 77 remote from the crank 72 and the rocker arm 73 is rigidly connected to the gear rack 71.

One end of a further spring means 85, for instance a gas pressure spring, is hingedly fastened to a support or bracket 83 rigidly connected to the floor structure 31 and formed, for instance, by an angle piece. The other end of this spring means engages the crank 72. The lower end of the casing or mantle of the flexible pull cable 29 is also fastened to the support 83. The pull cable 29 proper, i.e. its longitudinally translatable core which is advantageously rigidly constructed at its end region, is also connected with the crank 72, for instance hinged to a crank arm 72' of the crank 72.

During travel or transport motion of the gondola 21, the sensing member 27 assumes the position illustrated in FIG. 1 and the door leaves 43 are situated in their closed position. The elements of the door actuating apparatus 20 arranged in the floor structure 31 of the gondola 21 then have the positions illustrated in FIG. 6. In particular, the straight guides 51 then extend parallel to the sidewall 33 and align in pairs with one another. The pivot members or arms 61 are situated fully within the interior of the gondola in plan view in this condition.

When the gondola enters the station 5 in the direction of the arrow 91, the sensing member 27 is shifted upwardly by the control member 7. This motion is transmitted by the pull cable 29 to the crank 72 which is thereby pivoted in counterclockwise direction by, for instance, approximately 90° into the position illustrated in FIG. 7. The crank 72 draws the gear racks 71 via the connecting rods 77 away from the end walls 37. The gear racks 71 engaging the gear teeth 65' pivot both pivot arms 61 in opposite rotational directions so that the pivot arm 61 situated at the left in FIGS. 6 and 7 is pivoted in clockwise direction and the other pivot arm 61 in counterclockwise direction. The pins 63 which connect the pivot arms 61 with the door leaves 43 are moved into the position on the exterior sides of the sidewalls 33 illustrated in FIG. 7. Both door leaves 43 are correspondingly moved away from one another and outwardly into their open position. This has the result that the door leaves 43 now no longer extend fully parallel to the sidewall 33 in plan view as in the closed position, but are oriented slightly skewly outward away from the door opening or doorway 200. Correspondingly, the straight guides 51 are also pivoted somewhat toward the exterior, yet still remain within the interior space of the gondola 21. Two vertical contact or buffer planes 93 which delimit the most remote positions of cabin 23, e.g. of elastic pads or buffers extending horizontally along the end walls 37, are indicated in FIG. 7. As can be seen from FIG. 7 and also from FIG. 5, the door leaves 43 are also situated fully between these vertical contact planes 43 in the open position. Furthermore, the door leaves 43 also protrude only very little from the sidewall 33, so that they require only very little surrounding space when opening.

When the gondola 21 departs from the station 5 in the direction of the arrow 91, the control member 9 causes a downward translation of the sensing member 27. This has the result that the door leaves 43 are moved into their closed position.

The pivot arm pair or rocker arm 73 is arranged upon the crank pin 75 such that both pins 79 pass through a dead-center position shortly before reaching an end position when closing the door leaves 43. The spring means 81 is designed such that it generates a force pressing the gear racks 71 away from the crank 72 and the rocker arm 73 at least when the crank 72 assumes a position near the aforementioned dead-center position. The spring means 81 advantageously presses the gear racks 71 away from the crank 72 at least in that range of its motion which extends from the aforementioned dead-center position to that crank end position in which the door leaves 43 are closed. In other words, the spring means 81 always urge the door leaves 43 to close when the crank 72 is in the range of its rotation lying between the dead-center and end positions.

Figure 7:
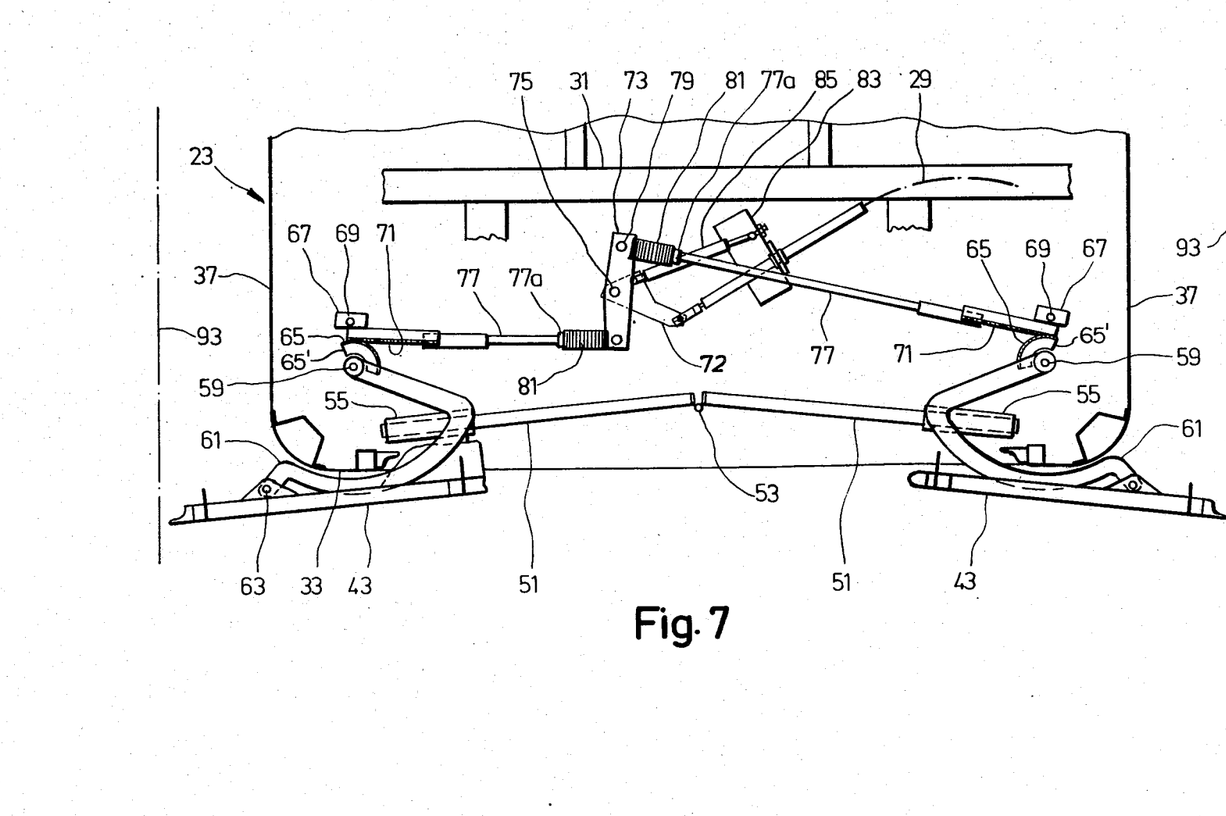
FIG. 7 shows a view corresponding to FIG. 6 but in which the door leaves are in the open position (various components have been omitted in FIGS. 6 and 7 and only the envelopes of various upright components which are sectioned per se, such as hollow profiled sections and gasket casings of the gondola cabin and of the door leaves, are indicated for the sake of representational simplicity)
Figure 8:
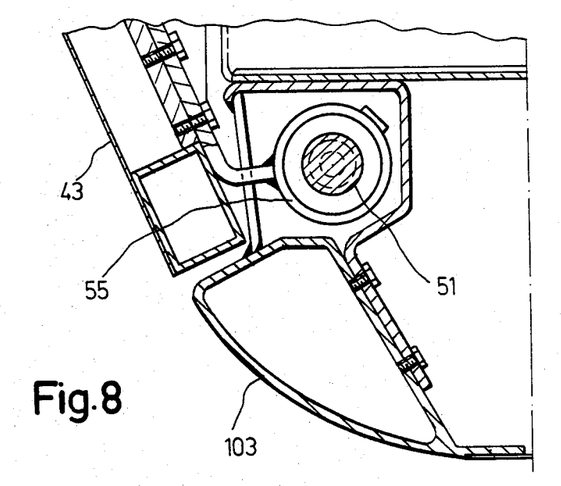
FIG. 8 shows a simplified section through the lower straight guide means of a door leaf in the closed position.

In contrast, the spring means 85 formed by the gas pressure spring is arranged such that its hinge pin 85', as can be seen from FIG. 7, reaches and transgresses a dead-center position shortly before the door leaves 43 are fully open.

Figure 6:
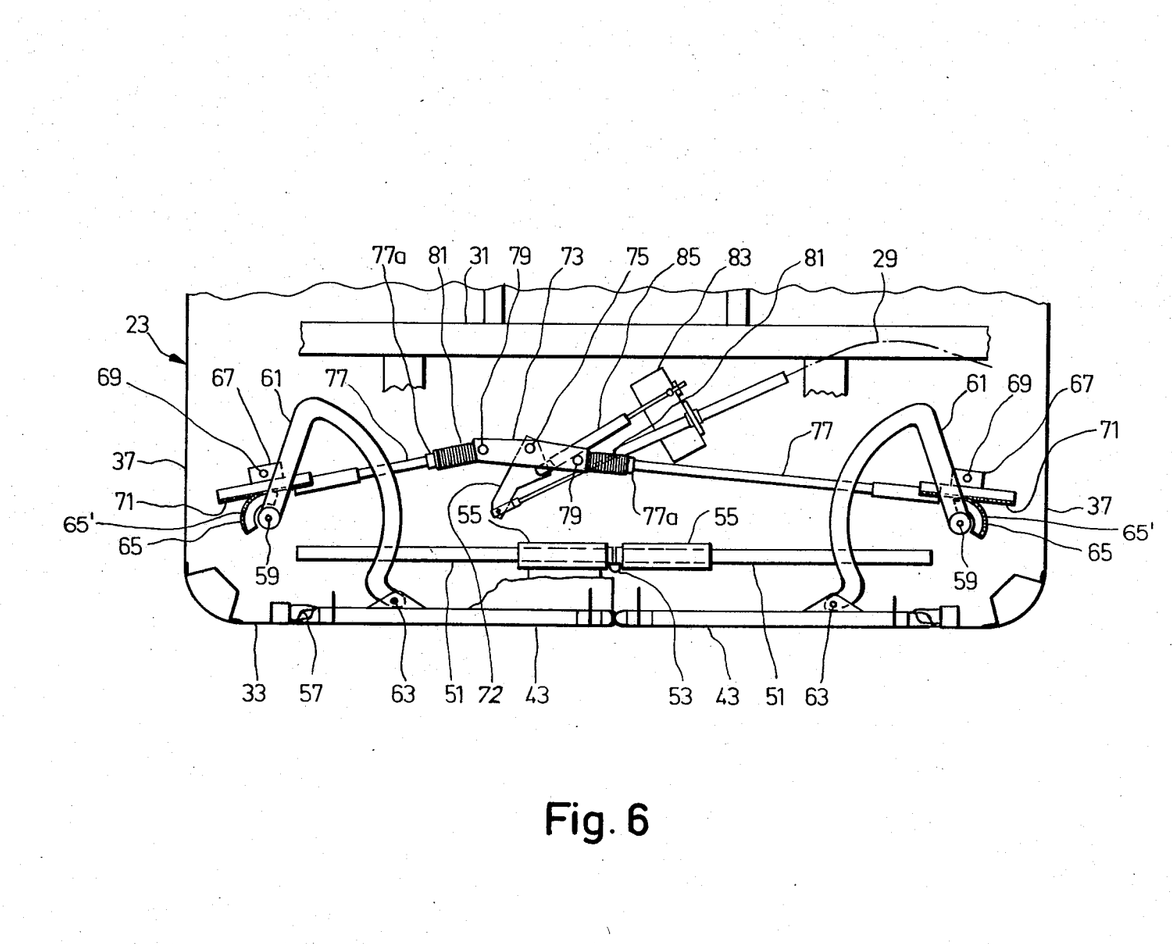
FIG. 6 shows a schematic horizontal section extending through the gondola just above the gondola floor with a plan view of the door actuating apparatus when the door leaves are in the closed position on an enlarged scale.

This has the result that the spring means 85 formed by the gas pressure spring holds the fully opened door leaves 43 open, yet carries out the once initiated closing process of the door leaves 43 continuously and safely to termination, since the force of the spring means 85 is constant but the torque which it applies to the crank 72, as can be seen from FIG. 6, is greatest in that position of the crank in which the door leaves 43 are closed. The spring means 81 and 85 therefore operate such that they tend to hold the door leaves 43 either fully closed or fully open. When, for instance, a passsenger jams a body member, such as an arm or head, in the door opening 200 during automatic closure of the door leaves 43, the door leaves 43 can leave a sufficiently great gap open yet be constantly subjected to a force which tends to close the gap.

Figure 9:
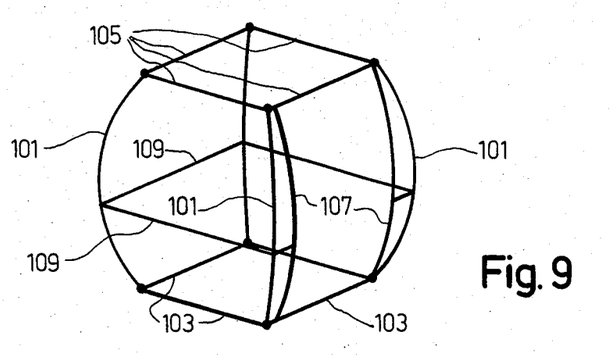
FIG. 9 shows a schematic perspective representation of the structural framework of a gondola cabin.

The major components of the structural framework 120 of the gondola cabin 23 are schematically illustrated in FIG. 9. This structural framework 120 comprises four structural members or bars, such as profiled section members 101, which extend upright from floor to roof along the edges of a sidewall 33 and an end wall 37 mutually abutting. Four profiled section members 103 forming a closed structural frame of the floor structure 31 and four profiled section members 105 forming a closed structural frame of the roof structure 39 are also provided. Two profiled section members 107 extending from bottom to top and forming the lateral limits of the door opening or doorway 200 are arranged in the sidewalls 33. Finally, profiled section members 109 are provided which extend horizontally along the sidewalls 33 and end walls 37 somewhat below the half height of the cabin 23. The profiled section member arranged on the sidewall 33 is interrupted at the door opening or doorway 200. The four profiled section members 101 all have substantially the same profile or cross-section, illustrated in FIG. 10, and are furthermore all substantially equally long. The profiled section member 101 is a tubular section, i.e. it delimits a void. The side of the profiled section member 101 situated on the exterior of the cabin 23 is convexly arcuate and comprises flanges protruding bilaterally beyond its tubular portion. The profiled section members 103 forming the floor frame and the profiled section members 105 forming the roof frame are all substantially equally long and have, except for a particularity of both hollow profiled sections of the sidewall 33, all the substantially same profile or cross-section, which is visible in FIG. 11. The profiled section members 103 and 105 are also tubular sections delimiting a void and having a convexly arcuate wall on the exterior which comprises flanges protruding bilaterally beyond the tubular portion. The profiled section member 103 forming the lower edge of the sidewall 33 and the profiled section member 105 forming the upper edge of this sidewall 33 differ from the remaining profiled section members 103 and 105 only in that one flange, namely that one which would confront the door opening or doorway 200, is cut off at least in the corresponding region of the doorway 200, as is illustrated for the profiled bar 103 in FIG. 8.

Figure 10:
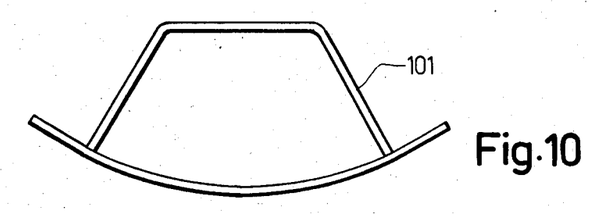
FIG. 10 shows the profile of an upright profiled section member in cross-section and FIG. 11 shows a schematic exploded view of a corner connection member.

The four profiled section members 101 are convexly arcuately curved in their longitudinal direction and the arcs or curves which they form each extend substantially within a vertical plane which forms an angle of 45° with the corresponding mutually adjoining walls in horizontal section.

Figure 11:
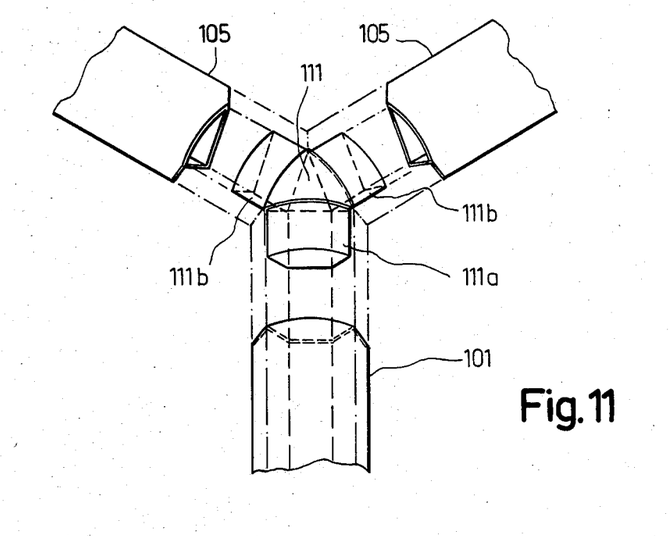

Furthermore, eight corner connection bodies or members 111 are provided, one of which is visible in FIG. 11. The corner connection member 111 comprises a central portion which is delimited by a spatially convex surface on its side facing away from the gondola interior space. Three plugs or dowels, namely a plug 111a and two plugs 111b, radiate from the central portion 111c of the connection member 111. The plug 111a can be inserted into the void of a profiled section member 101 without play. The plugs 111b can each be inserted into the void of a profiled section member 105, or also of a profiled section member 103, without play.

The corner connection members 111 make it possible to rapidly and simply interconnect the profiled section members 101, 103 and 105 with one another by plug connections. After plugging together, the profiled section members can be fixedly connected to the connection members 111 by supplementary fastening means for instance screws or rivets, or by welding or gluing.

The profiled section members 107 and 109 and the other framework components provided in the region of the floor structure 31 can be readily fastened to the profiled section members 101, 103 and 105 in any suitable manner. The sheet metal panels and window panes forming the sheating of the gondola cabin 23 can also be rapidly and simply fastened to the bilaterally protruding flanges of the profiled section members 101, 103 and 105. The mountings for the connection of the suspension structure or column 25 with the gondola cabin 23 can each be fastened to one of the four upper corner connection members 111 and additionally to the ends of the profiled section members interconnected by the connection members 111.

The gondola cabin 23 can therefore be assembled rapidly and with little or no welding work and is a very stable structure. Furthermore, all abutment locations of the sidewalls 33 and 35 and end walls 37 are connected with one another and with the floor or roof and all walls 33, 35 and 37 of the gondola cabin are convexly curved or bowed in vertical section so that they mutually converge, particularly toward the floor 31. The cabin 23 therefore has a low wind resistance. If the cabin 23 should be deflected by a side wind blowing transverse to the direction of travel in spite of the low wind resistance or by motions of the passengers, the maximum distance of a lateral edge of the floor 31 from a vertical plane extending through the support cable 1 is still relatively small.

The gondola 21 can naturally be designed not only for six passengers but also for a lesser or greater number of passengers, for instance for four or eight passengers, and the horizontal expanse of the end walls transverse to the direction of travel can be correspondingly modified, while the remaining dimensions can remain the same.

Figure 6A:
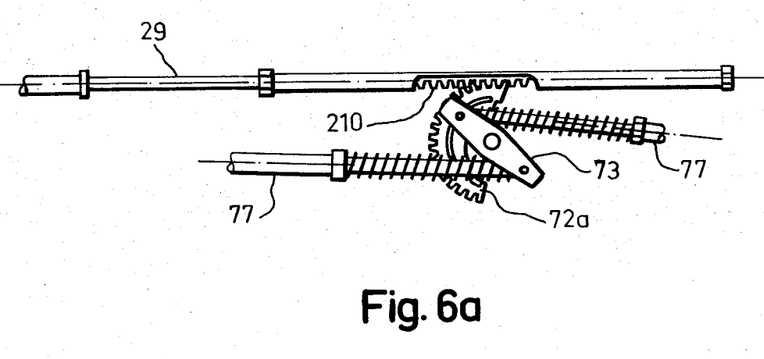
FIG. 6a shows an alternative detail of the door actuating apparatus of FIG. 6.

The crank arm of the crank 72 can alternatively be constructed as a sector gear or cylindrical gear 72a (see FIG. 6a). The end of the pull cable 29 remote from the sensing member 27 would then be connected to a translatably guided gear rack 210 which engages the gear teeth of the sector gear 72a, respectively gear, associated with the crank 72.

The spring means 85 constructed as a gas pressure spring can be possibly omitted under appropriate circumstances.

Furthermore, an emergency opening apparatus can be provided for opening the door leaves 43 in operational emergencies. The emergency opening apparatus can, for instance, comprise a horizontally translatable rod which, for instance, protrudes from the gondola 21 beneath the door leaves 43 and can be translated from the exterior. The crank 72 can then be provided with an arm or the like which the rod can engage in order to pivot the crank 22. The crank 72 can also be pivotable by a key insertable from the exterior or interior of the gondola. When the door leaves 43 are in the closed position, the crank 72 can then be pivoted so far with such rod or key unit that the door leaves 43 are opened.

The connection members 111 can be replaced by connecting members which possess extensions in place of the plugs 111a and 111b which are riveted to the surfaces of the profiled section members to be connected facing the interior of the gondola.

Additionally, only a single door leaf 43 for closing the door opening or doorway 200 can be possibly provided.

While there are shown and described present preferred embodiments of the invention, it is to be distinctly understood that the invention is not limited thereto, but may be otherwise variously embodied and practiced within the scope of the following claims. Accordingly,

What we claim is:

1. A cabin for accommodating passengers for a transport apparatus, such as a cable railway or the like, comprising:

at least one doorway;

at least one door member for closing said doorway;

at least one guide means associated with said at least one door member for translatably guiding said at least one door member along a substantially straight line;

said at least one guide means comprising upper guide means and lower guide means;

said upper guide means defining an upper substantially vertical pivot axis and being pivotably mounted to the cabin to pivot about said upper substantially vertical pivot axis;

said lower guide means defining a lower substantially vertical pivot axis coaxial with said upper vertical pivot axis and being pivotably mounted to the cabin to pivot about said lower pivot axis;

means defining at least one further substantially vertical pivot axis;

at least one pivot arm pivotable about said at least one further substantially vertical pivot axis;

means for pivoting said at least one pivot arm about said at least one further substantially vertical pivot axis;

a hinge connection for connecting said at least one pivot arm to said at least one door member;

a sensing member for sensing control members of a station of the transport apparatus; and door actuating means operatively connected with said sensing member for opening said at least one door member when entering said station and for closing said at least one door member when departing said station.

2. The cabin as defined in claim 1, wherein:

said at least one door member has a closed position closing said doorway and is capable of performing an opening motion; and said upper substantially vertical pivot axis and said lower substantially vertical pivot axis of said at least one guide means and said further vertical pivot axis about which said pivot arm is pivotable being arranged such that when said at least one door member performs said opening motion said at least one pivot arm constrains said at least one door member to move out of said closed position along said at least one guide means and simultaneously outwardly away from an exterior surface of the cabin.

3. The cabin as defined in claim 1, wherein:

said further substantially vertical pivot axis about which said at least one pivot arm pivots being situated within an interior space of the cabin.

4. The cabin as defined in claim 1, wherein:

said at least one door member has a closed position closing said doorway and is capable of performing an opening motion;

said at least one door member having a leading edge and a trailing edge;

said leading edge preceding said trailing edge when said at least one door member performs said opening motion; and said further substantially vertical pivot axis being arranged in proximity to said leading edge when said at least one door member is in said closed position.

5. The cabin as defined in claim 1, wherein:

said at least one door member comprises at least two door members;

said at least one guide means comprising at least two guide means for each door member of said at least two door members;

said at least one pivot arm comprising at least one pivot arm for each said door member;

said at least one further substantially vertical pivot axis comprising at least one said further substantially vertical pivot axis for each said door member;

said at least two door members, said therewith associated guide means and said therewith associated pivot arms serving for closing said at least one doorway;

a first door member of said at least two door members comprising an edge region;

a second door member of said at least two door members comprising an edge region adjoining said edge region of said first door member when said at least one door member is in said closed position; and said upper and lower substantially vertical pivot axes being arranged in proximity to said mutually adjoining edge regions of said first and second door members.

6. The cabin as defined in claim 1, wherein:

said door actuating means comprising said at least one pivot arm pivotably mounted to the cabin to pivot about said further substantially vertical pivot axis;

said at least one pivot arm comprising a substantially vertical pin;

said at least one pivot arm being hinged to said at least one door member by said substantially vertical pin;

a crank operatively connected with said sensing member;

a sector gear;

said at least one pivot arm being connected to said sector gear and fixed against rotation in relation thereto;

a gear rack;

mounting means for mounting said gear rack translatably and pivotably in relation to the cabin and in engagement with said sector gear;

an intermediate member of limitedly variable length;

a rocker arm mounted on said crank; and said gear rack being connected with said rocker arm by said intermediate member.

7. The cabin as defined in claim 1, further including:

a floor structure;

a roof structure;

a structural frame connecting said floor structure with said roof structure;

two mutually opposite sidewalls and two mutually opposite end walls arranged between said floor structure and said roof structure;

said at least one doorway being formed in at least one of said two side walls;

each of said two sidewalls meeting each of said two end walls at edge regions thereof;

profiled section members extending along said edge regions and serving to join said two sidewalls with said two end walls;

said two end walls being substantially convexly curved; and said two side walls being substantially convexly curved.

8. The cabin as defined in claim 7, wherein:

said edge regions where said two substantially convexly curved side walls meet said two substantially convexly curved end walls define substantially vertical planes extending substantially horizontally at substantially 45° to said two side walls; and each said profiled section member being substantially convexly curved in an associated one of said substantially vertical planes.

9. The cabin as defined in claim 1, further including:

a floor structure;

a roof structure;

a structural frame connecting said floor structure with said roof structure;

two mutually opposite sidewalls and two mutually opposite end walls arranged between said floor structure and said roof structure;

the at least one doorway being formed in at least one of said two sidewalls;

each of said two sidewalls meeting each of said two end walls at mutual abutment lines thereof;

profiled section members extending along said abutment lines and serving to join said two sidewalls to said two end walls;

said floor structure comprising a floor frame constructed of profiled section members;

all of said profiled section members having ends and incorporating a hollow void;

connection members for interconnecting said profiled section members at said ends thereof; and said connection members each comprising three connector plugs for engaging in said hollow void of associated ones of said profiled section members.

10. The cabin as defined in claim 1, wherein:

said at least one door member comprises at least two door members each having an outer surface and a closed position;

said at least one doorway defining an outer surface of the cabin; and said outer surfaces of said at least two door members being flush with one another and with said outer surface of the cabin when said at least two door members are in said closed position.

11. A cabin for accommodating passengers for a transport apparatus, such as a cable railway or the like, and wherein control members are arranged at stations, comprising:

a sensing member for sensing the control members;

at least one door member;

door actuating means operatively connected with said sensing member for opening said at least one door member when entering a station and for closing said at least one door member when departing a station;

means defining a substantially vertical pivot axis;

said door actuating means comprising at least one pivot arm pivotably mounted to the cabin to pivot about said substantially vertical pivot axis;

said at least one pivot arm comprising a substantially vertical pin;

said at least one pivot arm being hinged to said at least one door member by said substantially vertical pin;

a crank operatively connected with said sensing member;

at least one sector gear;

said at least one pivot arm being connected to said at least one sector gear and fixed against rotation in relation thereto;

at least one gear rack;

mounting means for mounting said at least one gear rack translatably and pivotably in relation to the cabin and in engagement with said at least one sector gear;

at least one intermediate member of limitedly variable length;

a rocker arm mounted on said crank; and said at least one gear rack being connected with said rocker arm by said at least one intermediate member.

12. The cabin as defined in claim 11, wherein:

said crank comprises a gear segment arranged essentially concentrically with said crank;

said door actuating means comprising a translatably guided gear rack operatively connected with said sensing means; and said gear segment operatively engaging said translatably guided gear rack.

13. The cabin as defined in claim 11, wherein:

said crank is capable of performing a pivoting motion for opening and closing said at least one door member;

said rocker arm and said at least one intermediate member mutually defining a dead-center position; and said rocker arm being connected on said crank such that when said crank performs said pivoting motion to open said at least one door member said rocker arm and said at least one intermediate member must initially conjointly transgress said dead-center position.

14. The cabin as defined in claim 11, wherein:

said crank is capable of performing a pivoting motion for opening and closing said at least one door member;

spring means provided for exerting a force on said crank; and said spring means being arranged in relation to said crank such that when said crank performs said pivoting motion to close said at least one door member said force exerted by said spring means initially opposes and subsequently supports and pivoting motion.

15. The cabin as defined in claim 14, wherein:

said at least one intermediate member of limitedly variable length comprises further spring means; and said further spring means comprise compression spring means mounted on said at least one intermediate member of limitedly variable length.

16. The cabin as defined in claim 15, wherein:

each said at least one intermediate member of limitedly variable length comprises a rod member having a first end, a second end, an abutment and a longitudinal extent;

said first end of said rod member being rigidly connected with said at least one gear rack;

a pivot member pivotably connecting said second end of each said rod member to said rocker arm;

each said pivot member translatably guiding each said rod member in the direction of said longitudinal extent; and said further spring means being arranged between said pivot member and said abutment of said rod member.

17. The cabin as defined in claim 16, wherein:

said at least one door member comprises two door members; and one of said at least one sector gears and one of said at least one intermediate members of limitedly variable length being provided for each door member of said two door members.

18. The cabin as defined in claim 14, wherein:

said at least one intermediate member of limitedly variable length comprises said spring means; and said spring means comprise compression spring means mounted on said at least one intermediate member of limitedly variable length.

19. The cabin as defined in claim 18, wherein:

each said at least one intermediate member of limitedly variable length comprises a rod member having a first end, a second end, an abutment and a longitudinal extent;

said first end of said rod member being rigidly connected with said at least one gear rack;

a pivot member pivotably connecting said second end of each said rod member to said rocker arm;

each said pivot member translatably guiding each said rod member in the direction of said longitudinal extent; and said spring means being arranged between said pivot member and said abutment of said rod member.

20. The cabin as defined in claim 11, wherein:

said crank comprises said at least one sector gear.

21. The cabin as defined in claim 11, further including:

two mutually opposite sidewalls;

at least one sidewall of said two mutually opposite sidewalls comprising said at least one doorway; and at least one said sidewall comprising said at least one doorway being convexly curved in vertical section.

22. The cabin as defined in claim 11, further including:
- at least one doorway for said at least one door member;
- at least one guide means associated with said at least one door member for translatably guiding said at least one door member along a substantially straight line;
- said at least one guide means comprising upper guide means and lower guide means;
- said upper guides means defining an upper substantially vertical pivot axis and being pivotably mounted to the cabin to pivot about said upper substantially vertical pivot axis; and
- said lower guide means defining a lower substantially vertical pivot axis coaxial with said upper pivot axis and being pivotably mounted to the cabin to pivot about said lower pivot axis.

* * * * *

UNITED STATES PATENT AND TRADEMARK OFFICE
CERTIFICATE OF CORRECTION

PATENT NO. : 4,655,144
DATED : April 7, 1987
INVENTOR(S) : ANTON FRECH et al.

It is certified that error appears in the above-identified patent and that said Letters Patent is hereby corrected as shown below:

Column 3, line 44, please delete "one" and insert --the--

Column 5, line 35, delete "the", second occurrence

Column 5, line 45, delete "manually" and insert --mutually--

Column 10, line 21, delete "unit"

Column 13, line 62, delete "connected" and insert --mounted--

Column 14, line 10, at the end of the line delete "and" (second occurrence) and insert --said--

Signed and Sealed this

Twenty-fifth Day of August, 1987

Attest:

DONALD J. QUIGG

*Attesting Officer*  *Commissioner of Patents and Trademarks*